United States Patent
Bonnah et al.

(10) Patent No.: US 11,665,619 B2
(45) Date of Patent: May 30, 2023

(54) DATA AND CONNECTIVITY MANAGEMENT SYSTEMS AND METHODS THEREOF

(71) Applicant: Honda Motor Co., Ltd., Tokyo (JP)

(72) Inventors: Jerry E Bonnah, Huntington Beach, CA (US); David M Kirsch, Torrance, CA (US); Justin E Sinaguinan, Playa Del Rey, CA (US)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 17/069,590

(22) Filed: Oct. 13, 2020

(65) Prior Publication Data
US 2022/0070758 A1 Mar. 3, 2022

Related U.S. Application Data

(60) Provisional application No. 63/070,683, filed on Aug. 26, 2020.

(51) Int. Cl.
| | |
|---|---|
| *H04W 48/02* | (2009.01) |
| *H04W 48/16* | (2009.01) |
| *H04W 4/48* | (2018.01) |
| *H04W 4/50* | (2018.01) |
| *H04W 76/11* | (2018.01) |

(52) U.S. Cl.
CPC ............ *H04W 48/02* (2013.01); *H04W 4/48* (2018.02); *H04W 4/50* (2018.02); *H04W 48/16* (2013.01); *H04W 76/11* (2018.02)

(58) Field of Classification Search
CPC ......... H04W 48/02; H04W 4/48; H04W 4/50; H04W 48/16; H04W 76/11
See application file for complete search history.

(56) References Cited

U.S. PATENT DOCUMENTS

| | | |
|---|---|---|
| 7,583,801 B2 | 9/2009 | Karina et al. |
| 7,602,808 B2 | 10/2009 | Ullmann et al. |
| 7,653,753 B2 | 1/2010 | Chen et al. |
| 8,121,291 B2 | 2/2012 | Karina et al. |

(Continued)

FOREIGN PATENT DOCUMENTS

| | | |
|---|---|---|
| CN | 109167780 A | 1/2019 |
| WO | 2005045603 A2 | 5/2005 |

*Primary Examiner* — Hassan A Phillips
*Assistant Examiner* — Hicham B Foud
(74) *Attorney, Agent, or Firm* — Joshua Freier; American Honda Motor Co., Inc.

(57) ABSTRACT

The present disclosure provides data and connectivity management systems and methods. A router application and/or service endpoint resolver in communication with a telematics control unit (TCU) may support devices and enable content, video or music streaming. In an illustrative embodiment, the router application and/or service endpoint resolver may receive a data access request to a resource identifier. A data plan associated with the vehicle may be accessed. In turn, a determination may be made on whether the resource identifier is within a preset list of resource identifiers defined by the data plan. The request to the resource identifier may be processed when the resource identifier is within the preset list of resource identifiers defined by the data plan. When no data plan exists for the vehicle or the resource identifier is not in the preset list, denial of the request may be made.

17 Claims, 10 Drawing Sheets

(56) References Cited

U.S. PATENT DOCUMENTS

| | | | |
|---|---|---|---|
| 8,145,120 B2 * | 3/2012 | Vermola | H04H 20/57 |
| | | | 725/39 |
| 8,374,958 B2 | 2/2013 | Blott et al. | |
| 8,620,764 B2 | 12/2013 | Moritz et al. | |
| 8,863,256 B1 | 10/2014 | Addepalli et al. | |
| 9,286,384 B2 | 3/2016 | Kuper et al. | |
| 9,319,381 B1 * | 4/2016 | Jones | H04L 63/10 |
| 9,331,983 B2 | 5/2016 | Zhou et al. | |
| 9,954,739 B2 | 4/2018 | Khanna | |
| 10,057,022 B2 | 8/2018 | Yoganathan et al. | |
| 10,104,525 B1 * | 10/2018 | Kaiser | H04L 67/025 |
| 10,122,591 B1 * | 11/2018 | Pack | H04L 63/101 |
| 10,360,296 B2 | 7/2019 | Greiner | |
| 10,643,149 B2 | 5/2020 | Kukehalli Subramanya et al. | |
| 10,691,683 B1 * | 6/2020 | Sanchez | H04W 72/087 |
| 10,749,841 B2 | 8/2020 | Kulper et al. | |
| 10,997,430 B1 * | 5/2021 | Slavin | H04W 4/38 |
| 2008/0120635 A1 * | 5/2008 | Trimper | H04N 21/4516 |
| | | | 348/E5.002 |
| 2010/0087167 A1 * | 4/2010 | Tsurutome | H04L 67/2819 |
| | | | 455/411 |
| 2010/0117810 A1 * | 5/2010 | Hagiwara | G06F 3/0483 |
| | | | 340/425.5 |
| 2011/0161667 A1 * | 6/2011 | Poornachandran | |
| | | | H04W 12/128 |
| | | | 713/168 |
| 2013/0132854 A1 * | 5/2013 | Raleigh | H04M 15/77 |
| | | | 715/738 |
| 2013/0205412 A1 | 8/2013 | Ricci | |
| 2013/0333039 A1 * | 12/2013 | Kelly | H04L 63/20 |
| | | | 726/22 |
| 2016/0021001 A1 * | 1/2016 | Nakagawa | H04L 12/6418 |
| | | | 370/389 |
| 2016/0088163 A1 * | 3/2016 | Pattabiraman | H04M 15/64 |
| | | | 455/406 |
| 2016/0205109 A1 * | 7/2016 | Kohli | H04L 63/102 |
| | | | 709/225 |
| 2017/0026231 A1 * | 1/2017 | Poosala | H04L 12/1407 |
| 2017/0134503 A1 * | 5/2017 | Cho | H04L 67/141 |
| 2018/0069898 A1 * | 3/2018 | Pacifici | H04L 63/20 |
| 2021/0103955 A1 * | 4/2021 | Kim | G06Q 30/018 |

\* cited by examiner

DATA AND CONNECTIVITY MANAGEMENT SYSTEMS AND METHODS THEREOF

RELATED DISCLOSURE

This disclosure claims priority to U.S. Provisional Application Ser. No. 63/070,683 filed Aug. 26, 2020 titled Data and Connectivity Management Systems and Methods Thereof, which is hereby incorporated by reference in its entirety.

BACKGROUND

An embedded telematics control unit (TCU) may provide a vehicle with data access through a wireless connection. This wireless connection may enable video, music or content streaming. For example, video-style media may be streamed directly to a rear entertainment system (RES) of the vehicle via the wireless connection. The wireless connection from the TCU may also support singular or multiple devices within the vehicle data access, such as a connection to the World Wide Web through the Internet.

When an active data plan exists, either through a free trial period or a paid subscription, a third party billing service may receive the data access request from the TCU, verify the requesting vehicle's plan, and allow for access to the data. When no plan exists, typically through expiration of the free trial period, the data access may be denied by the third party billing service. The request may be redirected to a purchase option plan where oftentimes the plan is not renewed. Lost subscriptions may lead to reduced profit.

A need for a more robust design, one in which provides data access services that is more cost conscious, is therefore needed. The present disclosure provides for data and connectivity management systems and methods thereof that address the above identified concerns. Other benefits and advantages will become clear from the disclosure provided herein.

BRIEF DESCRIPTION

According to one aspect of the present disclosure, a system for managing data access in a vehicle is provided. The system may include a memory for storing computer readable code and a processor operatively coupled to the memory. The processor may be perform processes that includes storing a preset list of accessible resource identifiers within the memory, receiving a data access request through a resource identifier, and connecting the data access request when the resource identifier is within the preset list of accessible resource identifiers within the memory.

In accordance with another aspect of the present disclosure, a non-transitory machine-readable storage medium having instructions, which when implemented by one or more machines, cause the one or more machines to perform operations is provided. The operations may include receiving a data access request for a resource identifier from a vehicle transmission control unit, accessing a data plan associated with the vehicle transmission control unit, determining whether the resource identifier is within a preset list of accessible resource identifiers defined by the data plan and processing the data access request for the resource identifier when the resource identifier is within the preset list of accessible resource identifiers defined by the data plan.

In accordance with yet another aspect of the present disclosure, a computer-implemented method for processing a resource identifier request in a vehicle is provided. The method may include storing a preset list of resource identifiers in the vehicle, receiving a data access request through a resource identifier, processing the data access request when the resource identifier is within the preset list of resource identifiers stored in the vehicle, and periodically synchronizing the preset list with a remote endpoint server.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure provides data and connectivity management systems and methods thereof that may be implemented on a vehicle or remote system. A router application and/or service endpoint resolver in communication with a telematics control unit (TCU) may support devices and enable content, video or music streaming. In an illustrative embodiment, the router application and/or service endpoint resolver may receive a data access request through a resource identifier. A data plan associated with the vehicle may be accessed. In turn, a determination may be made on whether the resource identifier is within a preset list of resource identifiers defined by the data plan. The request to the resource identifier may be processed when the resource identifier is within the preset list of resource identifiers defined by the data plan. When no data plan exists for the vehicle or the resource identifier is not in the preset list, denial of the request may be made.

Numerous other modifications or configurations to the data and connectivity management systems and methods thereof will become apparent from the description provided below. For example, the router application and service endpoint resolver may be used in combination to manage data access. The preset list may be synchronized with the router application through the service endpoint resolver. Advantageously, a more robust design is provided that allows data access services at a cost reduction. Unnecessary communications may also be removed. Other advantages will become apparent from the description provided below.

Figure 1:
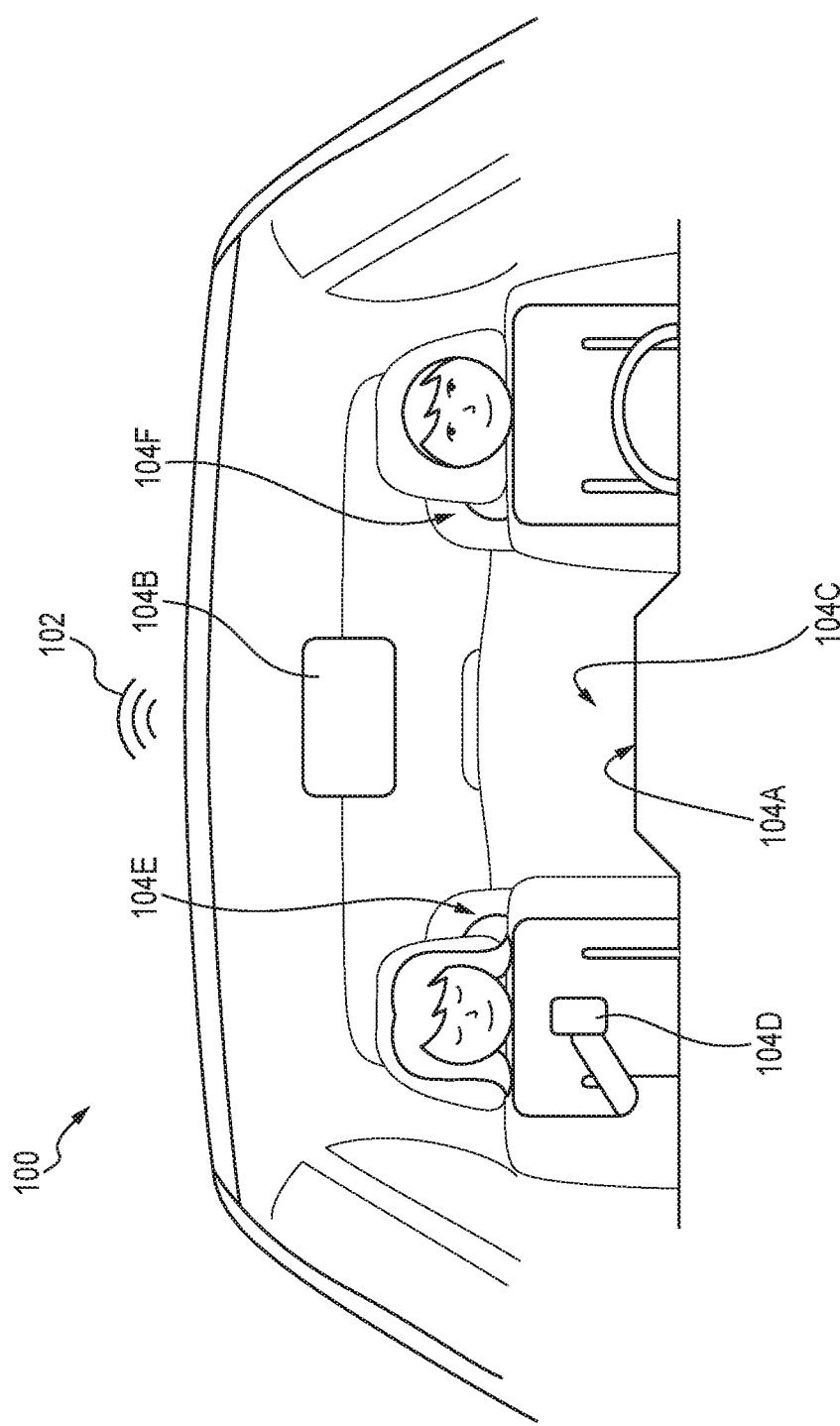
FIG. 1 is an exemplary vehicle illustrating connected devices to a vehicle area network in accordance with one aspect of the present disclosure.

Turning to FIG. 1, an exemplary vehicle 100 illustrating connected devices 104A, 104B, 104C, 104D, 104E and 104F (singularly device 104 or collectively devices 104) to a vehicle area network (VAN) 102 in accordance with one aspect of the present disclosure is provided. The VAN 102 may be connected into by the devices 104 wirelessly or through a wireline. The VAN 102 may be in communication with one or more corresponding devices 104. When wireless, the VAN 102 may be network compliant with an industry standard IEEE 802.11 network, i.e., a Wi-Fi network, or network compliant with industry standard IEEE 802.16, i.e., a WiMAX network, or Bluetooth network, or any other suitable wireless network.

The VAN 102 may act as a gateway between a cellular network. The cellular network may use a Global System for Mobile Communications/General Packet Radio Service (GSM/GPRS) link; a Universal Mobile Telecommunications System (UMTS) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link. The cellular network may in turn be connected to the Internet or any other network such as an intranet or another WAN, via a gateway.

The VAN 102 may also communicate with the Internet or other network through infrastructure within the vehicle's surroundings. Vehicle to infrastructure (V2I), vehicle to vehicle (V2V), vehicle to cloud (V2C), vehicle to pedestrian (V2P), vehicle to everything (V2X) may also be used to connect to the Internet.

The devices 104 in the vehicle 100 may be any processor based device having a wireless or wireline transceiver capable of receiving and transmitting data via the VAN 102 or serial line. In one example, the devices 104 may be a laptop (or notebook) computer equipped with a wireless network interface card, a wireless-enabled personal digital assistant, a pocket or palmtop computer, a Wi-Fi phone (e.g., a Skype phone or VoIP phone), a Wi-Fi appliance, a gaming console or some other portable, network-enabled gaming station, a video screen, a digital camera, an audio player, a navigation device, a security camera, an alarm device, a wireless payment or point of sale device, or an automotive electronic device.

A head unit 104A may be connected into the vehicle 100 through a serial line. This may be a wireline connection. The head unit 104A may provide infotainment, such as Internet radio streaming, live data (traffic, parking, and weather), on-board navigation systems, etc. Diagnostic information may also be displayed on the head unit 104A. This data or information may be taken directly off the vehicle 100.

Store and forward techniques may be implemented. In one example, the head unit 104A may take in information through a download sequence and store that information into the vehicle 100. This information may be stored in memory locally. The information may also be stored remotely such as in a cloud structure or system. Through these features, the head unit 104A may provide in-car content and service applications.

The vehicle 100 may include other devices 104 that may use the serial line. A rear entertainment system 104B, one such device, may be tied to the head unit 104A. Controls may be displayed on the head unit 104A which directs or actuates functions on the rear entertainment system 104B. In an illustrative example, the rear entertainment system 104B may include a DVD/CD player, high definition multimedia interface (HDMI) for an external plugged in source (e.g., gaming systems, video cameras, etc.), live streaming, as well as OnDemand content. Mirroring may occur from the head unit 104A to the rear entertainment system 104B, in one example.

The other devices within the vehicle 100 may include, a driver device 104C and passenger devices 104D, 104E and 104F, each of which may communicate with the VAN 102. In one embodiment, the driver device 104C may be connected to the head unit 104A, for example, through tethering. The driver device 104C may be differentiated from the passenger devices 104D, 104E and 104F. For example, content or data may be limited to the driver device 104C to remove driver distraction concerns. The passenger devices 104D, 104E and 104F may be connected within the VAN 102 wirelessly, or through individual ports within the vehicle 100 that may establish wireline connections. These connections may be through the serial line instead of the VAN 102.

A session between the devices 104 and the Internet may be implemented by connecting with the VAN 102 or serial line. The connection may use a TCP (Transmission Control Protocol) transport protocol. TCP is a core protocol of the Internet protocol suite, often simply referred to as "TCP/IP." Using TCP, applications on networked hosts may create connections to one another, over which they may exchange streams of data using stream sockets. Stream sockets may be a type of internet socket which provides a connection-oriented, sequenced, and unduplicated flow of data without record boundaries. The TCP protocol may provide reliable and in-order delivery of data from sender to receiver.

When a device 104 seeks to establish the TCP session with the VAN 102 or through the serial line to connect to the Internet, or other network, the TCP session may be established through a router application and/or service endpoint resolver. All end-user traffic between the devices 104 and the destination may be routed through the router application and/or service endpoint resolver.

The devices 104 may communicate with a remote server or endpoint through the VAN 102 or serial line. The remote server may operate through a web server that may have software or hardware dedicated to running applications to satisfy client requests received from the World Wide Web (WWW). On the hardware side, the web server may store a website's component files, for example HTML documents, images, CSS stylesheets, and JavaScript files. The web server may be connected to the Internet and support physical data interchanges with other devices connected to the Web.

On the software side, a web server may include several parts that control how web users may access hosted files. A Hyper Text Transfer Protocol (HTTP) server is a piece of software that understands uniform resource locators (URLs), i.e. web addresses, and HTTP (protocol that is used to view webpages). The web server may be accessed through the domain names of websites it stores, and may deliver its content to the end-user's devices 104.

In one illustrative example, when a browser makes a request for a file which is hosted on the web server, the browser may use HTTP. When the request reaches the correct web server (hardware), the HTTP server (software) may accept the request depending on permissions or authorizations. The HTTP server may locate the requested document and may send the document back to the browser, also through HTTP. If the document is not located, a 404 response may be returned.

The server running may include one or more processors and memory. The main memory may store, in part, instructions and data for execution by the processor. The main memory may store the executable code when in operation performs a number of processes. The server may further include a mass storage device, portable storage medium drive(s), output devices, input devices, and peripheral devices. A singular bus between the components may be used for one or more data transport functions. Alternatively, multiple bus lines may be used.

The devices 104 within the vehicle 100 may be used to receive content. In one example, accessible resource identifiers, such as URLs, may be used to access or retrieve content. When a browser makes a request for a file which is hosted on the web server, the browser uses HTTP. When the request reaches the correct web server (hardware), the HTTP server (software) may accept the request depending on permissions or authorizations. The HTTP server may locate the requested document and may send the document back to the browser, also through HTTP. If the document is not located, a 404 response may be returned.

A data access request through the resource identifiers may be made through the device, which may be then communicated through the VAN 102 or serial line and ultimately to the destination, that is, the web server. The router application and/or service endpoint resolver may monitor and adjust which sites may be accessed, with further description provided below. In unlimited plans, there is a certain amount of requests that may be made. After that request, traffic may be slowed down by a third party billing service.

Figure 2:
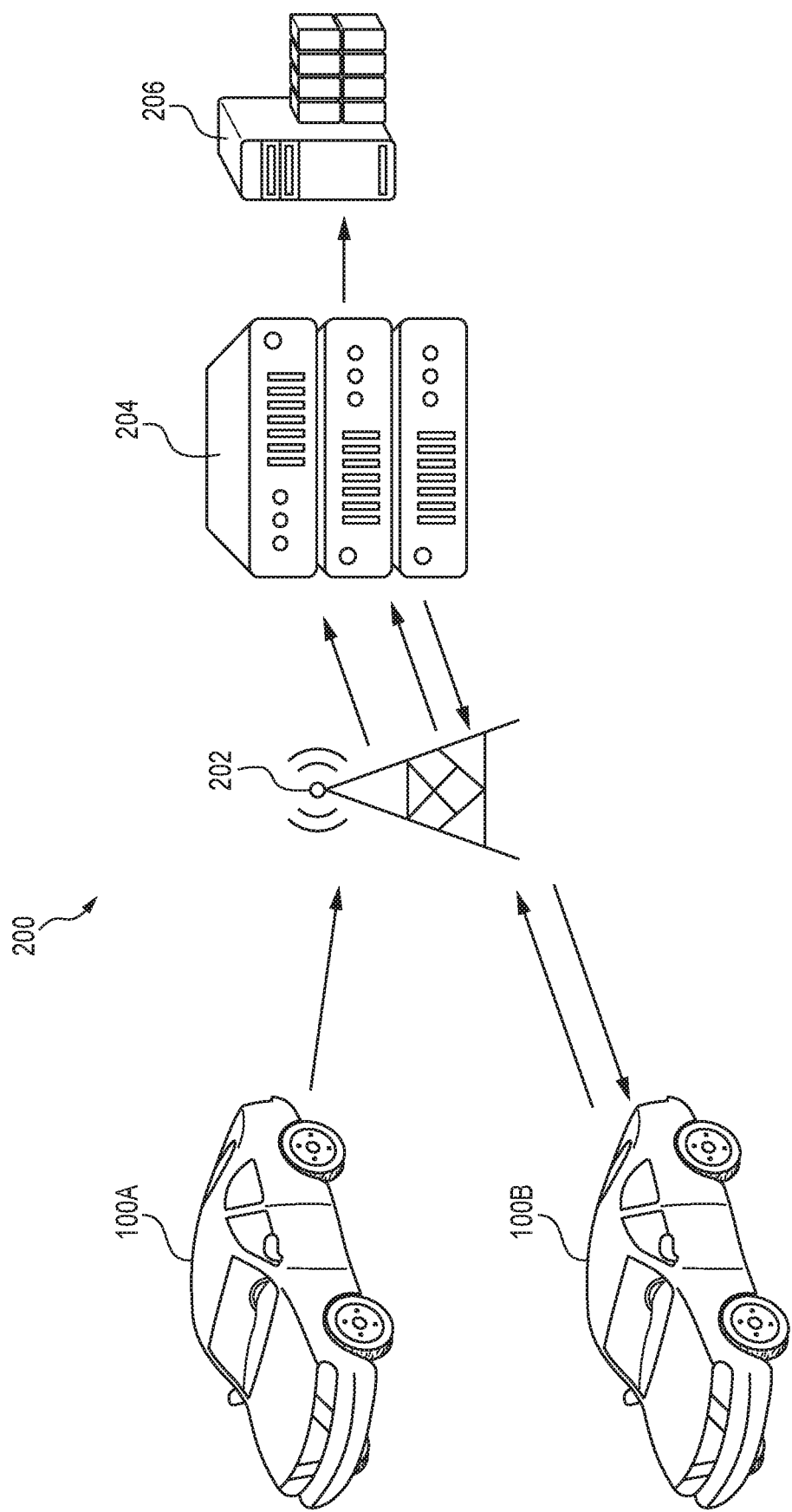
FIG. 2 is an exemplary environment of a third party billing service resolving data access requests in accordance with one aspect of the present disclosure.

FIG. 2 is an exemplary environment 200 of a third party billing service 204 resolving data access requests in accordance with one aspect of the present disclosure. A first vehicle 102A and second vehicle 102B (collectively vehicles 100 or singularly vehicle 100) will be described in relation to the third party billing service 204. Each vehicle 100 may request for data access through an accessible resource identifier, such as a URL.

The vehicles 100 may be distinguished by having an active data plan or no plan. The plan may be part of a free trial period or a paid subscription. Typically, free trial periods may last for six (6) months to one (1) year from the date of sale of the vehicle 100. By having a data plan, features and functions within the vehicle 100 may be implemented. Features may include, but are not limited to, remote engine start, access to a tire pressure management system, find car feature, send points-of-interest, fuel gauge, concierge service, remote lock/unlock, emergency service notifications, stolen vehicle tracking, remote diagnostics, streaming entertainment, and hotspot. Furthermore, requests through resource identifiers may be permitted or given access to.

For these features, the vehicles 100 may include a TCU to communicate with other servers. The TCU may communicate through a network 202. Network towers may be positioned at certain intervals and communicate with the vehicles 100 through radio waves. These towers may include a local antenna and a base station. A coverage area in which service is provided is divided into a mosaic of small geographical areas called cells, each served by a separate low power multichannel transceiver and antenna at a base station. The towers may handle cellular communications. Alternatively, the towers may be more of a widespread infrastructure for other types of communications.

The third party resolver billing service 204 may be connected through a network or networks with the network 202. For example, a combination of a local area network (LAN), a wide area network (WAN), a public switched telephone network (PSTN), or a satellite network, may be used such that the vehicles 100 may send and receive data to and from the third party resolver billing service 204.

The third party resolver billing service 204 may operate on a server. The server may include one or more processors and memory. The main memory may store, in part, instructions and data for execution by the processor. The main memory may store the executable code when in operation performs a number of processes. The server may further include a mass storage device, portable storage medium drive(s), output devices, input devices, and peripheral devices. A singular bus between the components may be used for one or more data transport functions. Alternatively, multiple bus lines may be used. The third party resolver billing service 204 may communicate with the endpoint 206 through the network 202, which is not shown.

In operation, as shown in the environment 200, a first vehicle 100A may have an active data plan with the third party resolver billing service 204. A data access request may be provided to the third party resolver billing service 204 through the network 202 or a series of networks. At the third party resolver billing service 204, the account for the vehicle 100A may be verified. After verification, the request may be sent to the endpoint 206. A wireless connection may then be setup between the endpoint 206 and the vehicle 102A. This wireless connection may support devices and may enable video or music streaming of content. Typically, this may occur through a resource identifier such as a URL.

However, and when no data plan exists as shown in the second vehicle 100B, a data access request may be denied by the third party resolver billing service 204. The service 204, which stores information about vehicles 100 and their access privileges, may perform a lookup and not be able to locate any plan associated with the vehicle 100B. In one embodiment, and after finding that no data plan exists, the third party resolver billing service 204 may return a billing page to the vehicle 100B to potentially sign them up for services.

In the environment 200, the third party resolver billing service 204 may control the payment and data access.

Simply, the service 204 may determine whether a data plan exists and passes or denies the data access request from the vehicles 100. Data and connectivity management systems may be more efficient than that described above. In particular, costs may be reduced by allowing a limited number of URLs and further, communications may be limited to locally performed processes.

Figure 3:
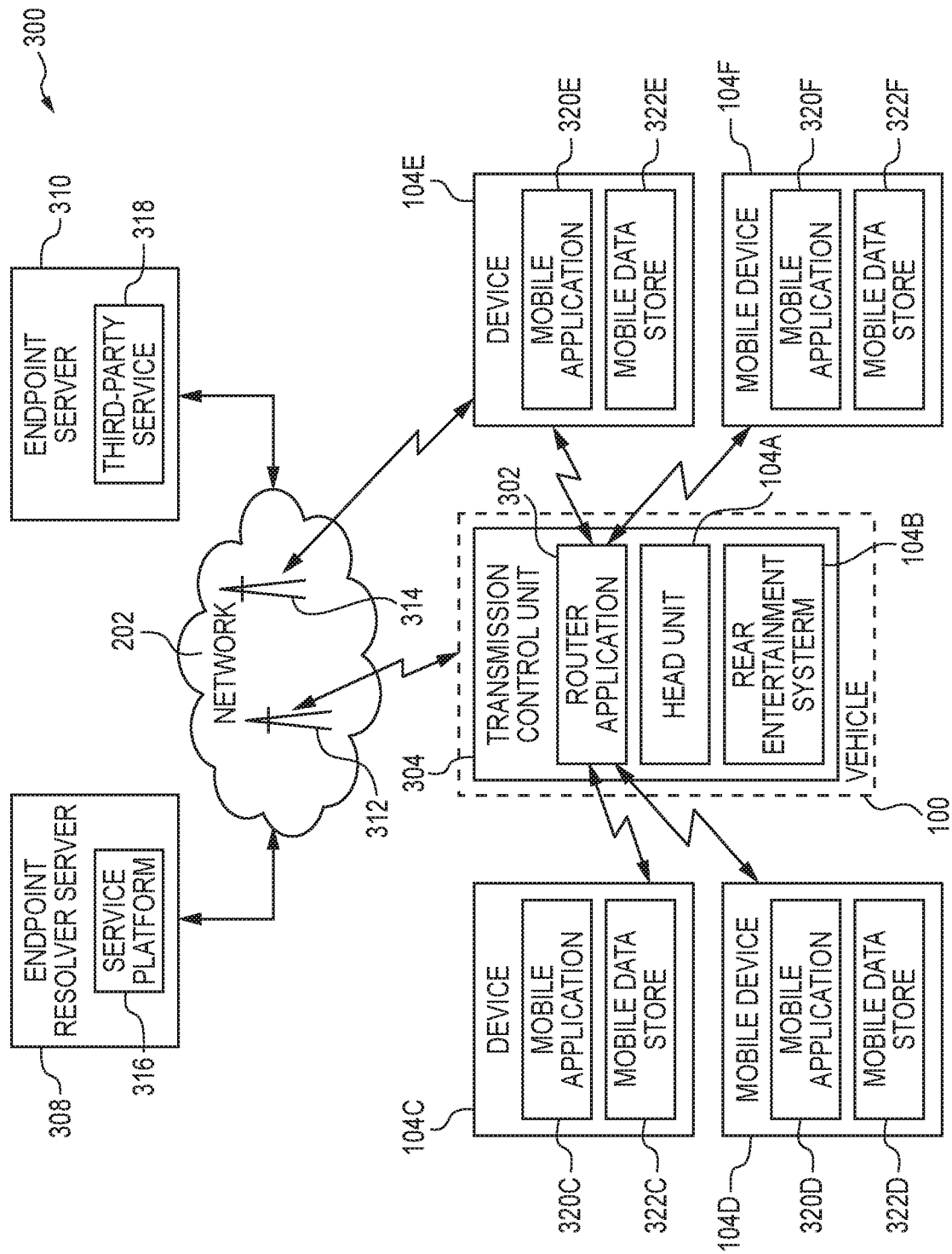
FIG. 3 is an exemplary environment illustrating components for resolving access to a resource identifier in accordance with one aspect of the present disclosure.

The previous system did not use a router application and/or service endpoint resolver. Rather, it was a simple check whether the vehicle 100 had a data plan or not. FIG. 3 is an exemplary environment 300 illustrating components for resolving access to a resource identifier in accordance with one aspect of the present disclosure. Through the disclosed environment 300, data transmissions may be lowered and further a reduced data plan may be implemented. Requests may also be handled locally.

The exemplary environment 300 may include a vehicle 100, having a router application 302 and TCU 304, connected to the network 202, with the network 202 communicatively coupled to an endpoint resolver server 308 and endpoint server 310. Each of the components within the vehicle 100 may be coupled to the network 202. The network 202 may include or take the form of one or more wired and/or wireless networks. The network 202 may include one or more wide area networks such as the Internet or a portion thereof, one or more cellular networks, one or more telephone networks, various intermediate networking devices, and edge devices such as wireless and/or wired access points 312 and 314.

Wireless access points 312 and 314 may support the same or different wireless communications protocols. In one illustrative example, wireless access points 312 and 314 may each support communications over wide-area cellular network protocols. As another example, wireless access point 314 may support communications over a local-area network using the Wi-Fi protocol, while wireless access point 312 may support communications over a wide-area cellular network.

The endpoint resolver server 308 may process data access requests from the vehicle 100. These requests may come in the form of resource identifiers such as URLs. The endpoint resolver server 308 may include a host service platform 316. This platform may include one or more servers that are co-located and/or geographically distributed. The service platform 316 may support a programming interface through which other computing devices and/or software modules (e.g., application programs or portions thereof) may obtain information, post information, access information, initiate or receive commands, and/or communicate with.

The service platform 316 of the endpoint resolver server 308 may include an account database. The database may include information regarding data plans of active/inactive users. Furthermore, the database may include a preset list of resource identifiers for each user or account holder. This preset list may otherwise be known as a whitelist. In operation, and when a request is made to the endpoint resolver server 308, the database on the service platform 316 may be accessed. The server 308 may check whether an account exists. If a resource identifier is received, and the requesting party has an account with data access, the resource identifier is checked against the preset list. Access may be permitted when the resource identifier is within the list.

The endpoint resolver server 308 may handle the data access requests from the vehicle 100. Alternatively, the endpoint resolver server 308 may act like a conduit for storing information regarding user accounts as well as accessible resource identifiers associated with those accounts. The server 308 may be used by users to adjust their accounts as well as the resource identifiers.

The endpoint server 310, for which more than one may be provided, may communicate with the endpoint resolver server 308 through the network 202. The endpoint server 310 may operate as a third-party service 318. The third-party service 318 may be one of a plurality of independently owned/operated third-party services that are made available by one or more different business entities relative to the owner/operator of endpoint server 310. Some third-party services 318 may include or take the form of social networking, education, commerce, entertainment, navigation, etc. The endpoint server 310 may include one or more server devices that are co-located and/or geographically distributed. The third-party services 318 may take the form of a web service or network-based service that is accessible over at least an Internet protocol portion of the network 202. The third-party service 318 may support a programming interface, such as an application programming interface (API) through which other computing devices and/or software modules of computing system may obtain information, post information, access information, initiate or receive commands, and/or communicate with or through the third-party service.

In one embodiment, the vehicle 100 may have functions or features similar to the endpoint resolver server 308, that is, the router application 302 on the vehicle. The router application 204 may take over incoming and outgoing data requests and transmission from other applications. Interactions may be managed through this takeover. Requests may be handled locally on the vehicle 100.

To reduce the cost associated with a data plan, a reduced amount of URLs which may be accessed is provided. In this way, the cost is reduced significantly by the network provider who operates the service platform 316 within the endpoint receiver server 308. In the vehicle 100, the router application 302 may be an access manager. The access manager may provide access for applications, data and web services, those of which are within a specified set of URLs. In one embodiment, the access manager may be used to provide a centralized single sign-on and single sign-out for applications, servers, and data.

The router application 302 may be within the vehicle 100 or on a personal mobile device. The application 302 may take in requests. From there, the application 302 may determine whether the particular vehicle 202 has data access, that is, has a data plan. The vehicle 100 may then check the requested URL with those stored in a whitelist on the vehicle 100 itself.

The whitelist of URLs are typically stored on the router application 302, or on the service platform 316 of the endpoint resolver server 308. The URLs may be changed, sometimes accompanied with a change fee. In one example, the data plan may allow for unlimited access to five (5) URLs. A change in URLs may cost an additional fee such as a change from one music streaming application to another. Fewer or more URLs may be accessed depending on the time of day. For example, different plans may exist on the weekend versus weekday. Times of the day may also affect how many URLs may be accessed.

Dynamic management of URLs may allow a user to keep track of which URLs are available under their specific plan. The user may choose a music streaming application, a weather application, or the like for their five (5) URLs. If the vehicle 100 is requesting access to a site that is not within their allotted plan, the dynamic management system may suggest a similar site that is within their user allotted plan. As will be shown, this feature may take place on the router application 302, the endpoint receiver server 308, or a combination of them.

The vehicle 100 may communicate with the network 202 through the TCU 304. The TCU 304 may interface with vehicle on-board diagnostic (OBD) systems, human operable client devices such as mobile and non-mobile computing devices 104, a service platform typically hosted at one or more network accessible servers, and various third-party services also typically hosted at one or more network accessible servers.

The TCU 304 may be connected to the cellular network as described above. Through the connection, the devices 104 may be enabled with content, video or music streaming. The tethered head unit 104A and the rear entertainment system 104B may receive this information through the serial line.

The driver and passenger devices 104C, 104D, 104E, and 104F may connect wirelessly with the TCU 304. Each of the driver and passenger devices 104C, 104D, 104E, and 104F may include a mobile application program 320C, 320D, 320E and 320F (singularly mobile application program 320 or collectively mobile application programs 320) and a mobile data store 322C, 322D, 322E and 322F (singularly mobile data store 322 or collectively mobile data stores 322).

In one example, the mobile application program 320 may take the form of a general-purpose application program such as a web browser. The web browser may have been included with the device 104 at the time of purchase or may form part of an operating system of the mobile computing device. In this context, a user may operate the web browser to navigate to any accessible network resource, including websites of the world-wide-web, service platform 316, and third-party services 318.

In another example, the mobile application program 320 may take the form of a special-purpose application program that is paired with and/or configured specifically for use with the TCU 304, service platform 316, and/or any suitable number of third-party services 318. In such case, the special-purpose application program may not have been included with the device 104 at the time of purchase. Typically, special-purpose application programs may be subsequently downloaded from an application program marketplace or network resource hosted at service platform 316, third-party service 318, or other suitable network location over communications network 202, after which the application program may be installed and executed at a computing device. A service-enabled computing device may be refer to a general-purpose computing device upon which a special-purpose application program operates that is paired with and/or configured specifically for use with one or more of a TCU or a network service such as service platform 316 and/or third-party service 318, for example.

The mobile data stores 322 on the devices 104 may include two types of storage, for example. Internal storage and external storage may be used. On most devices 104, internal storage is smaller than external storage. However, internal storage is always available on all devices, making it a more reliable place to put data on which your app depends. In one example, the data stores 322 may include photos and videos, application data, etc.

Figure 4:
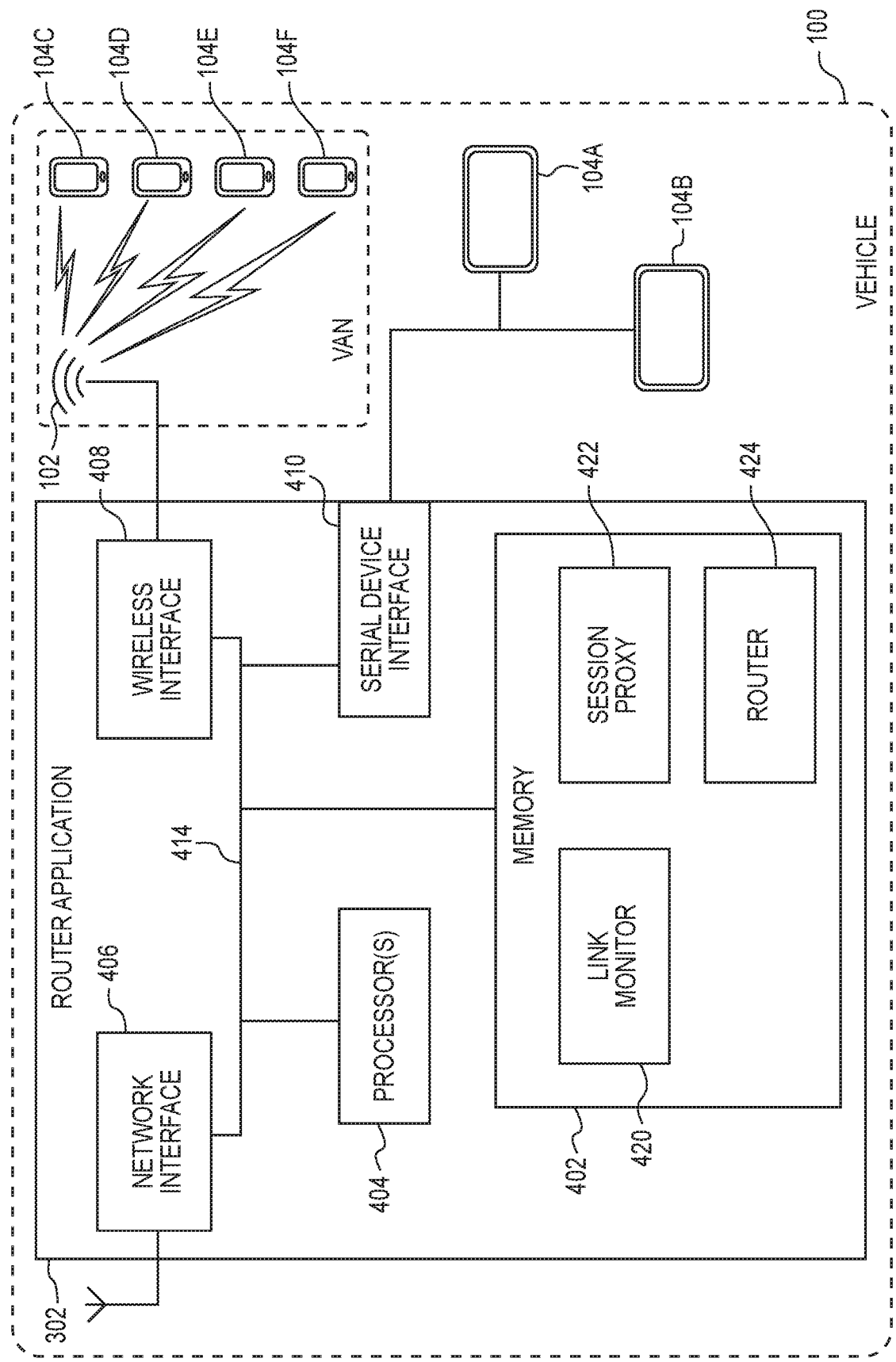
FIG. 4 is an exemplary router application on a vehicle side illustrating components to interface with devices in accordance with one aspect of the present disclosure.

As shown above, the router application 302 may be entirely set on the vehicle 100 itself. FIG. 4 is an exemplary router application 302 on a vehicle side illustrating components to interface with devices in accordance with one aspect of the present disclosure. The router application 302 may include memory 402, at least one processor 404, network interface 406, wireless interface 408, and serial device interface 410. Fewer or more component may be provided within the router application 302.

The processor 404 may execute various programs or instruction code stored in memory 402. The memory 402 may include one or more types of computer-readable media. As such, the memory 402 may include one or more memory chips, optical memory devices, magnetic memory devices, or other memory devices.

Various programs or program modules are executable by the processor 404. The program modules may include a link monitor 420, session proxy 422, and a router 424. These components may be stored in portions of memory 402 or in one or move separate memories.

The router 424 may be executed by the processor 404 to route data packets between a wireless network or cellular network, as described above. The data packets may be distributed to the devices 104. The link monitor 420 may monitor cellular communication links and also Internet communication links via the cellular network by sending test or probing data packets and monitoring for responses thereto. By monitoring the sending and receiving of test packets and responses, the processor 404 may execute the link monitor 420 if the cellular communication link or Internet link fails.

The network interface 406 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

The wireless interface 408 may connect with and provide the VAN 102 with a wireless local area network. Similarly, the interface 408 may communicate with one or more types of wireless network links such as a Wi-Fi, WiMAX, or Bluetooth link. This may communicate with the driver and passenger devices 104C, 104D, 104E, and 104F.

The serial device interface 410 may communicate with the head unit 104A and the rear entertainment system 104B to receive and transmit data packets. The serial devices may communicate with the router 424 using any suitable serial data protocol, including the USB (Universal Serial Bus) standard, the RS-232 standard, the RS-485 standard, or the IEEE 1394 (FireWire) standard, for example.

The processor 404, by executing the session proxy 422, acts as a session proxy for all TCP sessions going through the VAN 102 and the serial device interface 410 outside of the vehicle 100. When a device 104 seeks to establish a TCP session with a destination such as a third party server coupled to the Internet, a TCP session is established via the router 424 with the destination. The device 104 may also may maintain a separate TCP session when not using the router 424.

The router application 302 may include a vehicle network bus 414 that typically utilizes a standardized protocol over which data or commands may be communicated with various sensors, nodes, processors and other vehicular apparatus coupled to the vehicle network bus. The bus 414 may be a specialized internal communications network that interconnects components inside a vehicle (e.g. automobile, bus, train, industrial or agricultural vehicle, ship, or aircraft).

Special requirements for vehicle control such as assurance of message delivery, assured non-conflicting messages, assured time of delivery as well as low cost, EMF noise resilience, redundant routing and other characteristics are met with the use of various standardized networking protocols.

The vehicle network bus 414 may provide access to the various vehicle electronic control modules in the vehicle. Some of the typical electronic modules on today's vehicles are the Engine Control Unit (ECU), the Transmission Control Unit (TCU), the Anti-lock Braking System (ABS) and body control modules (BCM).

Figure 5:
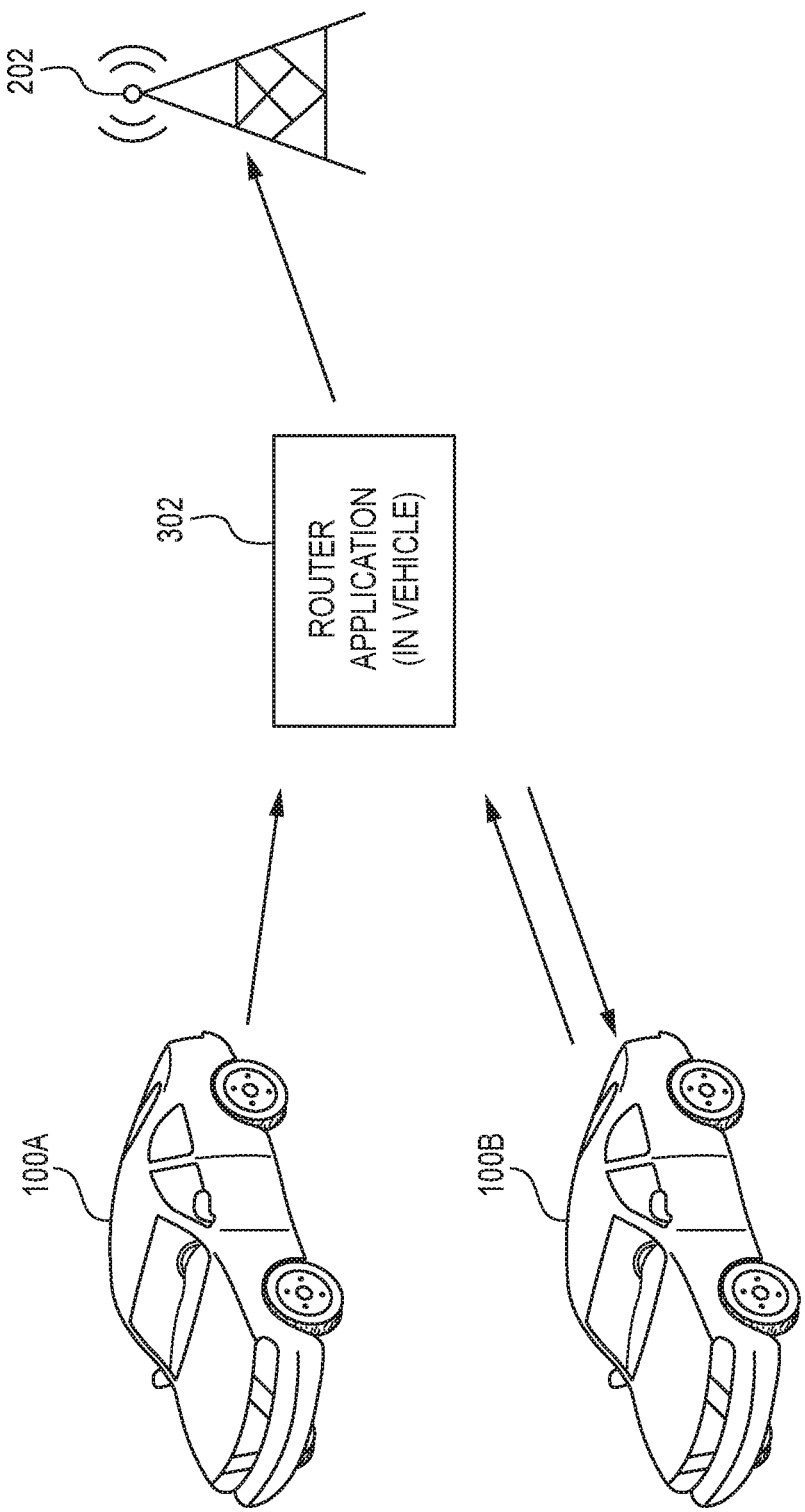
FIG. 5 is an exemplary system illustrating the router application on the vehicle side to process data access requests in accordance with one aspect of the present disclosure.

Multiple embodiments were described above having a router application and/or service endpoint resolver. The processing of the accessible resource identifiers, for example URLs, may occur on the vehicle, through the service endpoint resolver, or a combination of both. FIG. 5 is an exemplary router application 302 on a vehicle side to process data access requests in accordance with one aspect of the present disclosure. Similar to before, the vehicles 100A and 100B may either have an active data plan or no plan. Before communicating to the network 202 through their TCUs, the vehicles 100 may determine whether they have access locally through the router application 302. Thus, billing issues may be resolved on the vehicle side.

Multiple advantages may be realized through the router application 302 being placed on the vehicle 100. Advantageously, less network traffic occurs by reducing connections that may otherwise occur. That is, instead of having the TCU do the work, requests are handled locally.

To reduce the cost associated with a data plan, a reduced amount of URLs which may be accessed is provided. In this way, the cost is reduced significantly by the network provider who only operates a whitelist of URLs. In the vehicle 100, the router application 302 may be an access manager. The access manager may provide access for applications, data and web services, those of which are within a specified set of URLs. In one embodiment, the access manager may be used to provide a centralized single sign-on and single sign-out for applications, servers, and data.

The router application 302 may be within the vehicle 100 or on a personal mobile device. The application 302 may take in requests, that is, data access requests. From there, the application 302 may determine whether the particular vehicle 100 has data access through a data plan. The vehicle 100 may then check the requested URL with those stored in a whitelist on the vehicle itself.

The whitelist of URLs are typically stored on the router application 302. The URLs may be changed, sometimes accompanied with a change fee. In one example, the data plan may allow for unlimited access to five (5) URLs. A change in URLs may cost an additional fee such as a change from one music streaming application to another. Fewer or more URLs may be accessed depending on the time of day. For example, different plans may exist on the weekend versus weekday. Times of the day may also affect how many URLs may be accessed.

Dynamic management of URLs may allow a user to keep track of which URLs are available under their specific plan. The user may choose a music streaming application, a weather application, or the like for their five (5) URLs. If the vehicle 100 is requesting access to a site that is not within their allotted plan, the dynamic management system may suggest a similar site that is within an allotted plan.

When a denial of data access is provided, the web page that the user should be redirected to after the logout may be identified using a redirection URL. The router application 204 may append the redirection URL as a value of a parameter, such as "end URL," to the logout URL. Once the router application 204 performs the logout, the user is redirected to this "end URL". That is, the user may be redirected to a location pointed to by the end URL. In one example, this may be redirected to a site for upgraded services.

In one embodiment, firmware updates may be used to update billing information and whitelists on the vehicle 100. This may be performed through over-the-air (OTA) updates. The updates may be distributed over the network 202.

The router application 204 may also provide a human machine interface (HMI). That is, the application 204 may provide a user interface where a number of different options may be provided and selected. For example, the user may be presented with a number of different billing options that relate to how many accessible resource identifiers may be requested. Five (5), ten (10), and fifteen (15) URLs may be activated for use by the vehicle 100 depending on the plan selected by the user within the vehicle's HMI.

Figure 6:
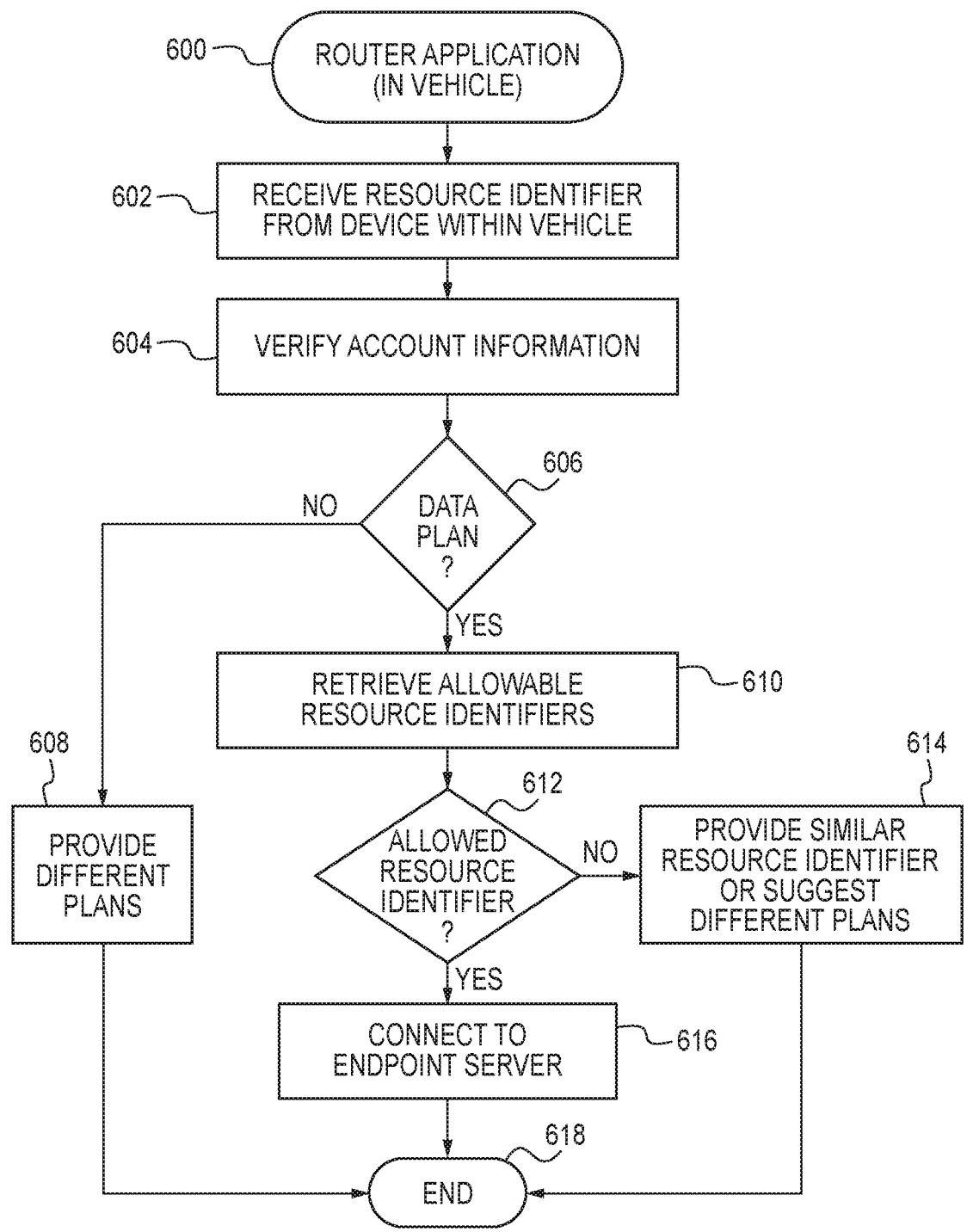
FIG. 6 is an illustrative flowchart showing processes for implementing the router application on the vehicle side in accordance with one aspect of the present disclosure.

FIG. 6 is an illustrative flowchart showing processes for implementing the router application on the vehicle side in accordance with one aspect of the present disclosure. These processes are for illustrative purposes and should not be construed as limiting. The processes may begin at block 600. The processes are from the perspective of the router application within the vehicle.

At block 602, the router application may receive a resource identifier from a device within the vehicle. This may be accessed through one of the passenger or driver devices. These devices may access the resource identifier through their browsers. The data request may also be received from one of the serial devices such as the head unit or rear entertainment system. The resource identifier may be able to access content, video or music streaming, for example.

On the vehicle, the user's account may be verified at block 604. This occurs on the vehicle for this embodiment. The account information may be downloaded through the TCU and stored within memory on the vehicle. At decision block 606, a determination may be made on whether a data plan exist. The data plan, in one example, is related to the vehicle and not the individual users on the vehicle.

In one alternative implementation, the users on the vehicle may have their own data plans. This may be particularly useful for ride sharing services, or non-owned vehicles, where the user would access their own data plan. The non-vehicle owners would not use the vehicle's data plan. Rather, the user would access their own. The whitelist of URLs may be established within their device's memory.

If there is no data plan for the vehicle, at block 608, the vehicle through the HMI on the router application may suggest or provide access plans. In an illustrative example, an unlimited access plan may be presented with purchasing options. Credit card and automated payment screens may be provided. Limited access plans, such as the one described above, may also be provided. Through this limited access, five (5) URLs may be queried by the devices within the vehicle. The processes may end at block 618.

When a data plan exists for the vehicle, at block 610, the vehicle retrieves allowable resource identifiers. The list of allowable resource identifiers may be downloaded through the TCU through an OTA update. The identifiers may be specific for this vehicle and may be downloaded through vehicle identification information such as a vehicle identification number (VIN).

At decision block 612, a determination is made whether the retrieved resource identifier is one of the identifiers within the vehicle's plan. This may be achieved through comparing or matching the received resource identifier from the device with those retrieved and stored within memory on the vehicle. The accessible resource identifiers may be stored in a whitelist.

At block 614, and when the resource identifier is not within one of the approved resource identifiers as defined by the user's plan, the vehicle may provide a similar resource identifier or suggest different plans to expand the amount of URLs that they may access. In one example, one streaming service may be substituted for one that is within the accessible list. Other substitutions may include one social networking service for another that is within the whitelist. If multiple URLs are owned by a parent company, access may still be provided. For example, Instagram access may be given regardless if the URL is not within the whitelist if one of the accessible URLs is Facebook. The processes may end at block 618.

If the resource identifier is within the whitelist and is accessible by the vehicle, as deemed by the restricted access plan, the device within the vehicle may be connected to the endpoint server that is hosting the URL at block 616. The device within the vehicle may connect through the router application, and then through the vehicle's TCU to the endpoint server. The communication between the vehicle's TCU may go through the network to receive and transmit data to and from the endpoint server. The processes may end at block 618.

Figure 7:
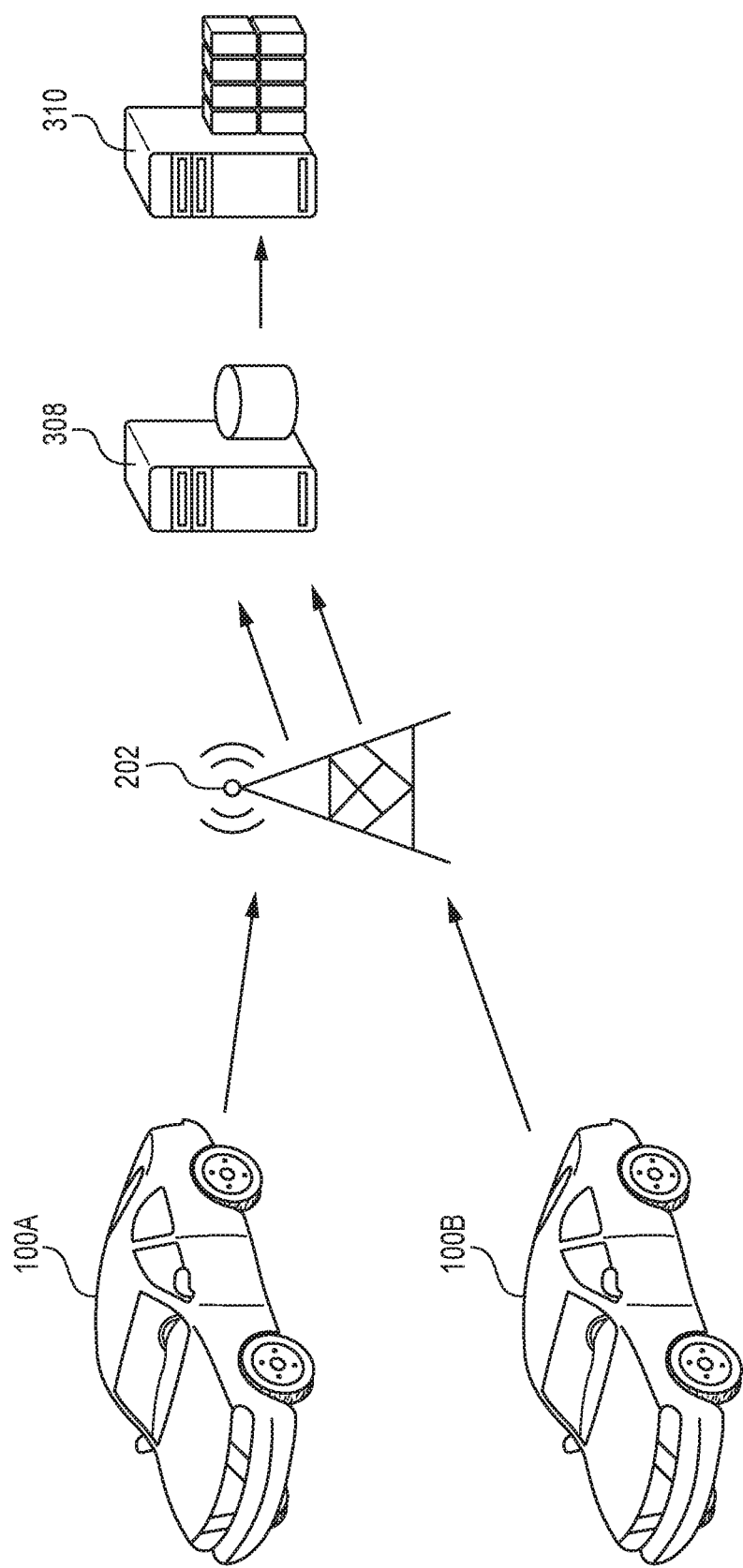
FIG. 7 is an exemplary endpoint resolver server handling data access requests in accordance with one aspect of the present disclosure.

Previously, the vehicle had a router application that handled the requests. Turning to FIG. 7, an exemplary endpoint resolver server 308 handling data access requests in accordance with one aspect of the present disclosure is provided. The vehicles 100A and 100B may communicate with the network 202. Communications from the vehicle 100A with the data plan and the vehicle 100B without the data plan may be provided to the network 202 through the TCU of each vehicle 100. In this implementation, there is no router application on the vehicle 100.

Communicatively coupled to the network 202 may be the service endpoint resolver 308. The service endpoint resolver 308 may perform similar functions and features as the router application within the vehicle described above. The resolver 308 may take the form of a server. The resolver 308 may determine if the vehicle is authorized to reach the endpoint server 310 and if it has an active plan. The service endpoint resolver 308 may maintain a list of accessible resource identifiers, such as URLs, and status of active data plans. The resolver 308 may be based on a cloud computing structure. Billing plans, similar to those described above, may be implemented.

In one embodiment, the accessible resource identifiers may be changed through the service endpoint resolver 308. This may occur through an HMI on the vehicle 100 and transmitted up through its TCU to the resolver 308. Fees may be assessed when a change occurs to the accessible URLs. This information may be stored along with the data plan of the vehicle 100.

Once approved, as having a data plan and accessible URLs, the vehicle 100A may send a data access request to the endpoint 310 through the service endpoint resolver 308. The resolver 308 make communicate with the endpoint 310 through the network as defined above. Identifier information (billing) may be sent with the communication. If the data access request was not authorized on the billing plan, a denied message may be sent back to the vehicle 100B. That is, if no data plan exists or the requested URL is not within the data plan, denial of access to the request may be given.

Figure 8:
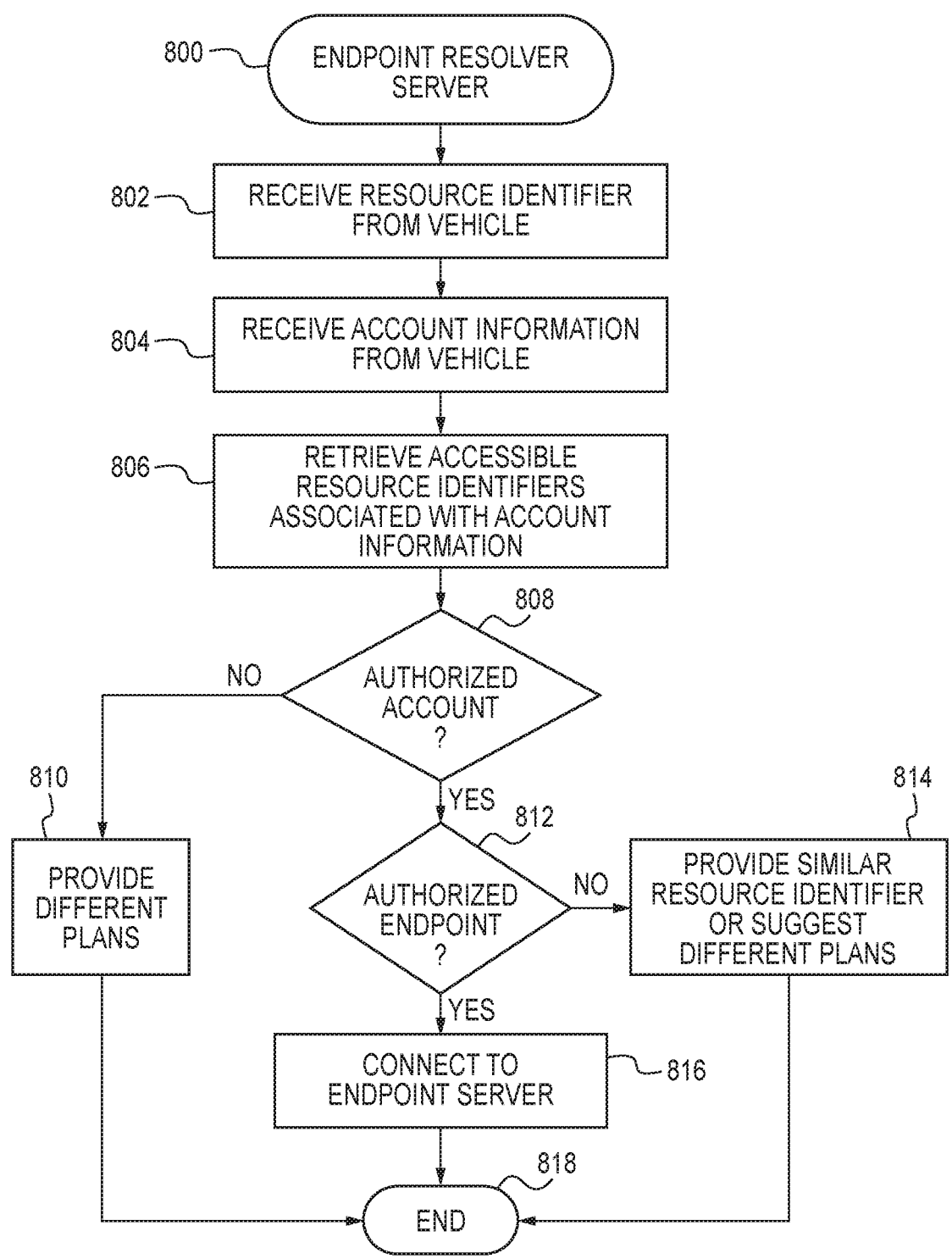
FIG. 8 is an illustrative flowchart showing processes for the endpoint resolver server in accordance with one aspect of the present disclosure.

FIG. 8 is an illustrative flowchart showing processes for the endpoint resolver server in accordance with one aspect of the present disclosure. These processes are for illustrative purposes and should not be construed as limiting. The processes may begin at block 800. The processes are from the perspective of the endpoint resolver server.

At block 802, the endpoint resolver server may receive a resource identifier from the vehicle. The vehicle may retrieve this identifier from one of the devices on the vehicle. These devices may access the resource identifier through their browsers. The data request may also be received from one of the serial devices such as the head unit or rear entertainment system. The resource identifier may be able to access content, video or music streaming, for example. This information may be transmitted through the TCU of the vehicle up to the network, and finally to the endpoint resolver server.

Account information regarding the particular vehicle may be received at block 804. The account information may be stored on the endpoint resolver server. Vehicle identifying information may be sent with the resource identifier request. This information may be matched or compared with accounts stored on the endpoint resolver server. At block 806, and using the account information for the particular vehicle, the endpoint resolver server may retrieve the accessible resource identifiers associated with the account information. The vehicle may have an unlimited or restricted plan. The unlimited plan may provide access to all resource identifiers, while the restricted plan may have a restricted amount, for example, five (5) URLs.

At decision block 808, a determination is made whether the vehicle has an authorized account for data request. This determination is made on the endpoint resolver server. The endpoint resolver server, at block 810, may provide different plan options if a valid account does not exist for the vehicle or associated with the user. In an illustrative example, an unlimited access plan may be presented with purchasing options. Credit card and automated payment screens may be provided. Limited access plans, such as the one suggested above, may be provided. Through this limited access, five (5) URLs may be accessed by the devices within the vehicle. The processes may end at block 818.

If the vehicle has an authorized account, at decision block 812, a determination is made whether the retrieved resource identifier is one of the identifiers within the vehicle's plan. This may be achieved through comparing or matching the received resource identifier from the device with those retrieved and stored within memory on the vehicle. The accessible resource identifiers may be stored in a whitelist.

At block 814, and when the resource identifier is not within one of the approved resource identifiers as defined by the user's plan, the vehicle may provide a similar resource identifier or suggest different plans. In one example, one streaming service may be substituted for one that is within the accessible list. Other substitutions may include one social networking service for another. If multiple URLs are owned by a parent company, access may still be provided. For example, Instagram access may be given regardless if the URL is not within the whitelist if one of the accessible URLs is Facebook. The processes may end at block 818.

If the resource identifier is within the whitelist and is accessible by the vehicle, as deemed by the restricted access plan, the device within the vehicle may be connected to the endpoint server that is hosting the URL at block 816. The device within the vehicle may connect through the router application, and then through the vehicle's TCU to the endpoint server. The communication between the vehicle's TCU may go through the network to receive and transmit data to and from the endpoint server. The processes may end at block 818.

In one alternative implementation, the users on the vehicle may have their own data plans. This may be particularly useful for ride sharing or non-owned vehicle services where the user would access their own data plan. Through this, the vehicle owner would not have to allow access to their own plan to support data access request. Rather, the user would access their own data plan and thus, their own resource identifiers.

Figure 9:
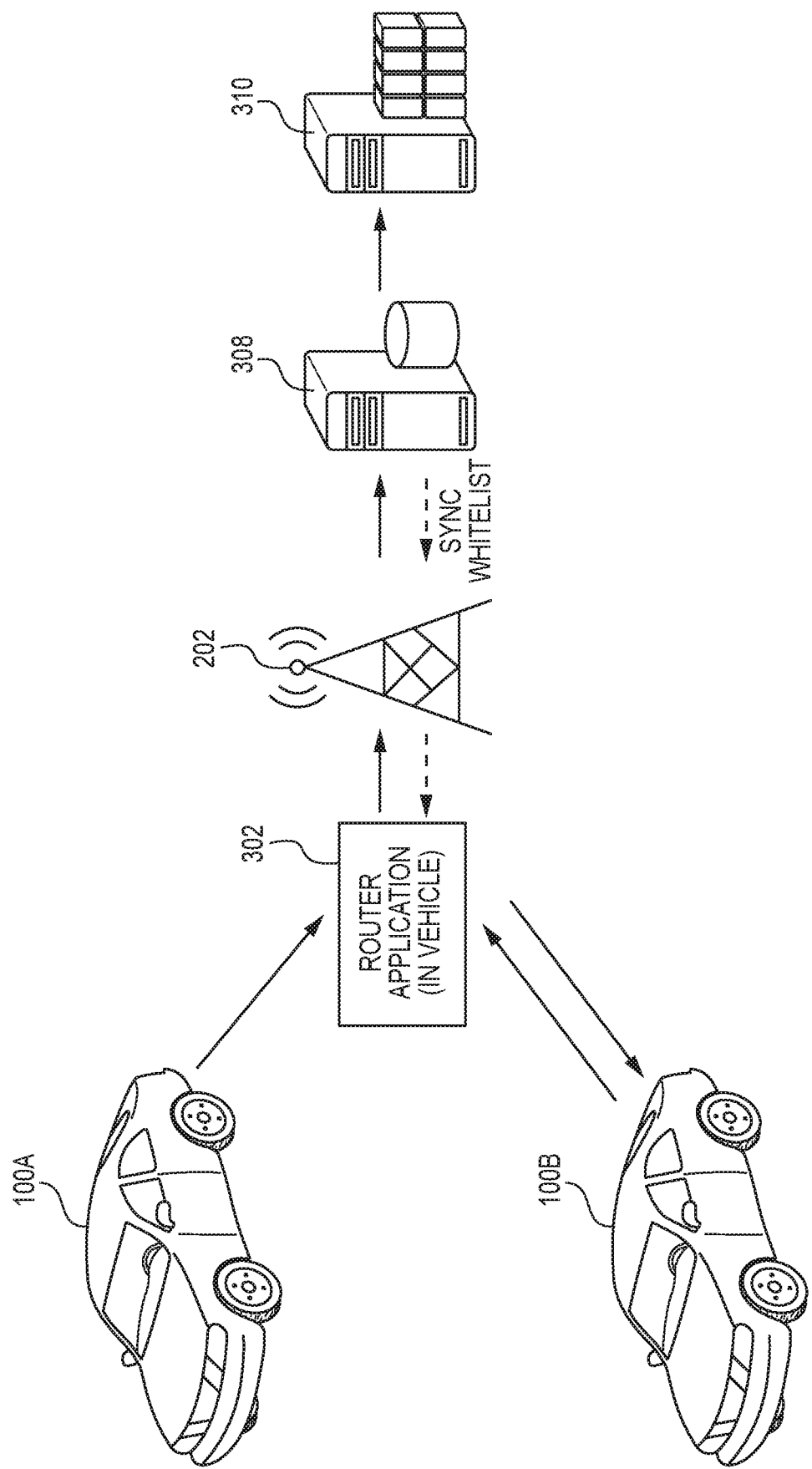
FIG. 9 is an exemplary combination of the router application and service endpoint resolver for handling data access requests in accordance with one aspect of the present disclosure.

Referring to FIG. 9, a combination of the exemplary router application 302 and service endpoint resolver 308 for handling data access requests in accordance with one aspect of the present disclosure is provided. In this environment, the router application 302 may be periodically synchronized with an approved whitelist for the vehicle 100A which is received from the service endpoint resolver 308. Advantageously, this may allow for data cost savings at the vehicle level.

The router application 302 on the vehicle 100 may determine if the vehicle 100 is authorized to reach the endpoint 310 and if it has an active data plan. Data plans may be checked on the router application 302. In the illustrative example, the first vehicle 100A may have a data plan and the second vehicle 100B may have no data plan.

The router application 302 may handle locally the human machine interface to communicate to the user that their requested data path is not allowed. In one embodiment, the interface may guide them to use the approved list according to their plan or upsell them to a plan which has more access capabilities. The router application 302 may check whether the vehicle 100 has a valid account and whether the accessed resourced identifier by the devices within the vehicle 100 are within the stored whitelist before communicating with the network 202.

The service endpoint resolver 308 may maintain a global list of allowable URLs and status of active vehicle plans. The resolver 308 may be based on a cloud computing structure. Billing plans, similar to those described above, may also be stored on the service endpoint resolver 308. The service endpoint resolver 308 may update the router application 302 on the vehicle 100 through OTA updates via the TCU on the vehicle 100. Other methods for updating the router application may be used, for example, through infrastructure communications.

The service endpoint resolver 308 may act as a remote storage facility for the router application 302. The whitelist of accessible resource identifiers may be stored on the service endpoint resolver 308 and may be synchronized with the router application 302. This may occur periodically, for example, every day, week, or month. The data stored on the service endpoint resolver 308 may have priority status. In other words, the information on the service endpoint resolver 308 may be the master which may not be changed, unless proper authorization is given. This authorization may be given through proper password credentials or other verification methods.

Information on the service endpoint resolver 308 may be updated or modified by other computing devices that may be tied into the network 202 through properly authorized access. They may change the data access or whitelist of accessible URLs. In one example, those who may change it are not the users. Rather, personnel who work with the service endpoint resolver 308 may modify it.

In one embodiment, if the vehicle 402 is requesting access to a site that is not within their allotted plan, it may suggest one that is within their allotted plan. For example, Pandora may be used instead of Spotify. Thus, a dynamic adjustment of URLs may be made. If multiple URLs are owned by a parent company, access may still be provided. For example, Instagram access may be given regardless if the URL is not within the whitelist if one of the accessible URLs is Facebook.

Figure 10:
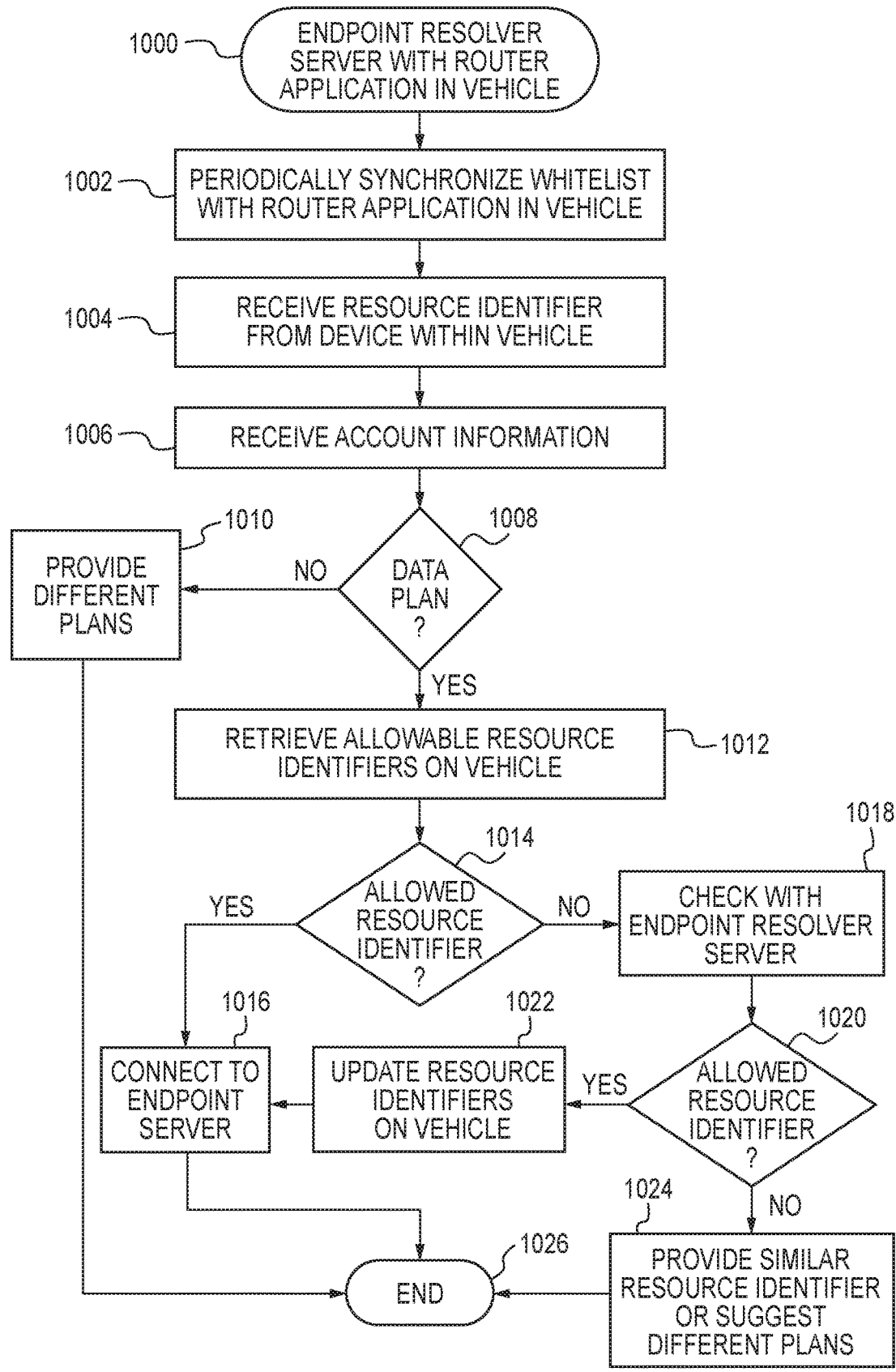
FIG. 10 is an illustrative flowchart showing processes for the exemplary router application and service endpoint resolver in accordance with one aspect of the present disclosure.

FIG. 10 is an illustrative flowchart showing processes for the exemplary router application and service endpoint resolver in accordance with one aspect of the present disclosure. These processes are for illustrative purposes and should not be construed as limiting. The processes may begin at block 1000. The processes are from the perspective of the router application on the vehicle.

At block 1002, the router application may be periodically synchronized. This may include receiving an updated whitelist from the service endpoint resolver. In one embodiment, each time the whitelist is updated on the service endpoint resolver, the router application on the vehicle may be automatically updated. Alternatively, or in combination, the router application may be updated every day, week or month with the accessible resource identifiers in the whitelist.

In addition, account information regarding the specific vehicle may be updated. For example, when an account expires, this information may be synchronized with the service endpoint resolver. This may remove information on the router application on the vehicle. Prior information about the account and whitelist may also be removed if the account expires.

At block 1004, the router application on the vehicle may receive a resource identifier from a device within the vehicle. This may be accessed through one of the passenger or driver devices. These devices may access the resource identifier through their browsers. The data request may also be received from one of the serial devices such as the head unit or rear entertainment system. Through the resource identifier, access to content, video or music streaming may be provided.

At block 1006, account information for the vehicle may be received. This information may be located on the vehicle. The data plan associated with the vehicle may also be retrieved. At decision block 1008, a determination may be made on whether a data plan exist. The data plan, in one example, is related to the vehicle and not the individual users on the vehicle.

At block 1010, the router application may provide different plan options if a valid account does not exist for the vehicle. In an illustrative example, an unlimited access plan may be presented with purchasing options. Credit card and automated payment screens may be provided. Limited access plans, such as the one suggested above, may be provided. Through this limited access, five (5) URLs may be accessed by the devices within the vehicle. Further increases on the number of accessible URLs would correspond to an increase in cost. The processes may end at block 1026.

When a data plan exists for the vehicle, at block 1012, the vehicle retrieves allowable resource identifiers on its local memory. As mentioned earlier, these may be periodically synchronized with the service endpoint resolver. The identifiers may be specific for this vehicle and may be identified through its vehicle identification number (VIN). The identifiers may be retrieved off local memory.

At decision block 1014, a determination is made whether the retrieved resource identifier is one of the identifiers within the vehicle's plan. This may be achieved through comparing or matching the received resource identifier from the device with those retrieved and stored within memory on the vehicle. The accessible resource identifiers may be stored in a whitelist.

If the resource identifier is within the whitelist and is accessible by the vehicle, as deemed by the restricted access plan, the device within the vehicle may be connected to the endpoint server that is hosting the URL at block 1016. The device within the vehicle may connect through the router application, and then through the vehicle's TCU to the endpoint server. The communication between the vehicle's TCU may go through the network to receive and transmit data to and from the endpoint server. The processes may end at block 1026.

If the resource identifier is not within the whitelist, at block 1018, the router application may in one embodiment check with the endpoint resolver server to determine whether it is a valid accessible resource identifier. At decision block 1020, a determination is made whether the requested resource identifier is within a whitelist that is associated with the vehicle's account on the endpoint resolver server.

When the resource identifier was not found on the endpoint resolver server, at block 1024, the router application or service endpoint resolver may suggest a similar site that is within the vehicle's allotted plan. In one example, one streaming service may be substituted for one that is within the accessible list. Other substitutions may include one social networking service for another. If multiple URLs are owned by a parent company, access may still be provided. For example, Instagram access may be given regardless if the URL is not within the whitelist if one of the accessible URLs is Facebook. The processes may end at block 1026.

Otherwise, and when the resource identifier is found within the endpoint resolver server, the whitelist may be updated at block 1022 within the router application of the vehicle. If the resource identifier is within the whitelist and is accessible by the vehicle, as deemed by the restricted access plan, the device within the vehicle may be connected to the endpoint server that is hosting the URL at block 1016. The device within the vehicle may connect through the router application, and then through the vehicle's TCU to the endpoint server. The communication between the vehicle's TCU may go through the network to receive and transmit data to and from the endpoint server. The processes may end at block 1026.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for managing data access in a vehicle, comprising:
a memory for storing computer readable code; and
a processor operatively coupled to the memory, the processor configured to:
store a preset list of accessible resource identifiers for each account holder specific to a vehicle identification number within the memory stored locally on the vehicle;
receive a data access request through a resource identifier from a serial device of the vehicle; and
connect the data access request to a similar resource identifier when the resource identifier is not within the preset list of accessible resource identifiers within the memory stored locally on the vehicle, wherein the similar resource identifier is provided by a dynamic management system which provides a similar site within the preset list as the requested resource identifier.

2. The system for managing data access in the vehicle of claim 1, wherein the processor receives input modifying the preset list of accessible resource identifiers within the memory.

3. The system for managing data access in the vehicle of claim 1, wherein the data access request is from a personal mobile device.

4. The system for managing data access in the vehicle of claim 1, wherein the data access request is from an onboard vehicle device.

5. The system for managing access in the vehicle of claim 4, wherein the onboard vehicle device is a rear entertainment system.

6. The system for managing data access in the vehicle of claim 1, wherein the preset list of accessible resource identifiers is stored in a vehicle router application.

7. The system for managing data access in the vehicle of claim 1, wherein the preset list of accessible resource identifiers is stored in a remote server.

8. The system for managing data access in the vehicle of claim 1, wherein the preset list of accessible resource identifiers is stored in a vehicle router application and updated periodically from a remote server.

9. A non-transitory machine-readable storage medium comprising instructions, which when implemented by one or more machines, cause the one or more machines to perform operations comprising:
receiving a data access request for a resource identifier from a serial device of a vehicle;
accessing a data plan associated with a vehicle identification number;
determining whether the resource identifier is within a preset list of accessible resource identifiers defined by the data plan;
substituting a similar resource identifier from a dynamic management system when the resource identifier is not within the preset list, wherein the dynamic management system provides a similar site within the preset list as the requested resource identifier; and
processing the data access request for the resource identifier when the resource identifier is within the preset list of an accessible resource identifiers stored locally on a router application of the vehicle in communication with a telematics control unit within the vehicle.

10. The non-transitory machine-readable storage medium of claim 9, wherein processing the data access request for the similar resource identifier comprises sending the data access request to an endpoint server defined by the resource identifier.

11. The non-transitory machine-readable storage medium of claim 10, wherein the data plan is stored in a cloud computing structure.

12. A computer-implemented method for processing a resource identifier request in a vehicle, comprising:
storing a preset list of resource identifiers specific to a vehicle identification number in local memory of the vehicle;
identifying a parent company from the preset list of resource identifiers;

receiving a data access request through a resource identifier from a serial device of the vehicle;

processing the data access request when the parent company of the resource identifier is identified; and periodically synchronizing the preset list with a router application on the vehicle in communication with a telematics control unit within the vehicle through a remote endpoint server.

13. The computer-implemented method of claim 12, wherein the preset list is based on a data plan.

14. The computer-implemented method of claim 13, comprising verifying whether the data plan exists.

15. The computer-implemented method of claim 12, comprising displaying the preset list when the resource identifier is not within the preset list.

16. The computer-implemented method of claim 12, comprising displaying a pricing plan for upgraded options to increase a number of resource identifiers in the preset list.

17. The computer-implemented method of claim 12, wherein the remote endpoint server is in a cloud computing structure.

\* \* \* \* \*